United States Patent [19]

Spencer et al.

[11] Patent Number: 5,088,447
[45] Date of Patent: Feb. 18, 1992

[54] TRANSPONDER READER ARM ASSEMBLY

[75] Inventors: William E. Spencer, Kansas City, Mo.; Mofazzal H. Chowdhury, Lenexa, Kans.

[73] Assignee: Alfa-Laval Agri, Inc., Kansas City, Mo.

[21] Appl. No.: 553,522

[22] Filed: Jul. 16, 1990

[51] Int. Cl.⁵ .................. A01K 5/02; B61K 1/00; B61L 3/12
[52] U.S. Cl. ................ 119/51.02; 246/167 R; 104/88
[58] Field of Search .............. 119/51.02, 57.92; 104/88; 246/167 R, 192 R, 193, 194, 202

[56] References Cited

U.S. PATENT DOCUMENTS

| 2,578,863 | 12/1951 | Trelease | 119/57.92 X |
| 3,516,575 | 6/1970 | Moffitt | 119/51.02 X |
| 4,129,855 | 12/1978 | Rodrian | 119/51.02 X |
| 4,313,397 | 2/1982 | Markum | 119/51.02 X |
| 4,426,955 | 1/1984 | Monroe et al. | 119/51.02 |
| 4,463,353 | 7/1984 | Kuzara | 119/51.02 |
| 4,617,876 | 10/1986 | Hayes | 119/51.02 X |
| 4,655,170 | 4/1987 | DaSilva | 119/51.02 |
| 4,712,511 | 12/1987 | Zamzow et al. | 119/51.02 |
| 4,915,030 | 4/1990 | Matsuo et al. | 104/88 |

FOREIGN PATENT DOCUMENTS

| 2754274 | 10/1978 | Fed. Rep. of Germany | 119/51.02 |
| 2595202 | 9/1987 | France | 119/57.92 |
| 0378208 | 4/1973 | U.S.S.R. | 119/57.92 |
| 0467727 | 4/1975 | U.S.S.R. | 119/51.02 |
| 1168156 | 7/1985 | U.S.S.R. | 119/57.92 |

Primary Examiner—Robert J. Spar
Assistant Examiner—Scott L. Lowe
Attorney, Agent, or Firm—Hovey, Williams, Timmons & Collins

[57] ABSTRACT

A transponder reader arm assembly is useful with feed cars for automatically feeding livestock in order to place a transponder reader in close proximity to a transponder worn by the livestock. The transponder reader arm assembly hereof includes a pivotally mounted arm connected to a mounting bracket at an inboard end and presenting an outwardly extending distal end having a transponder reader connected thereto. The transponder reader arm includes a biasing spring which serves to center the arm to an outwardly extending orientation. The transponder reader may be mounted directly to the distal end of a single arm or to a connecting linkage between a pair of parallel arms.

21 Claims, 2 Drawing Sheets

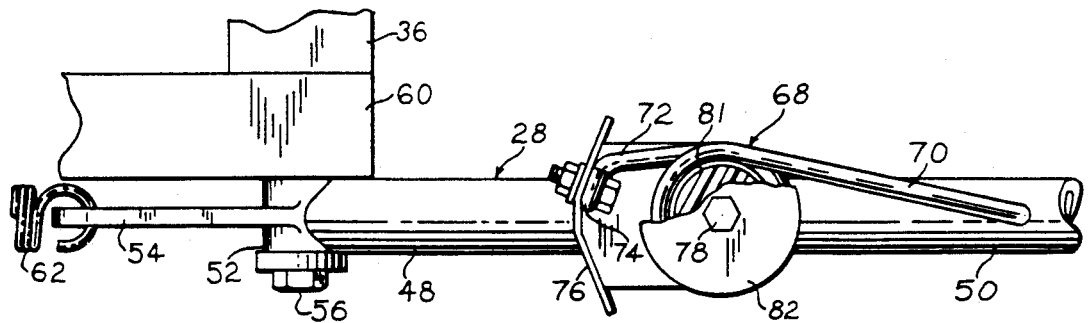
FIG. 3.
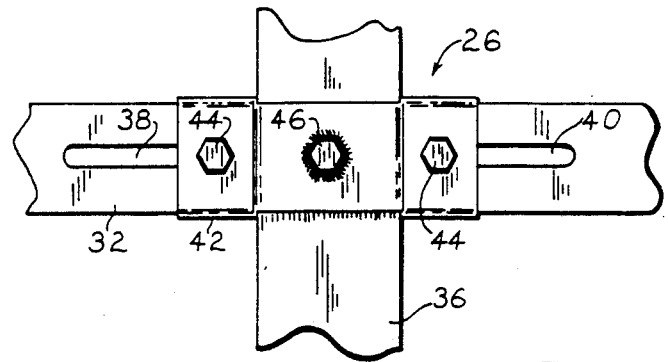
FIG. 4.
FIG. 5.
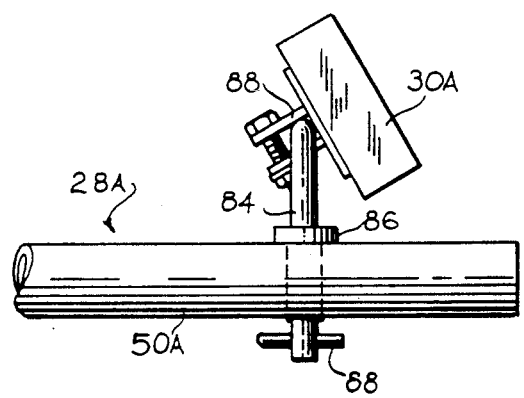
FIG. 6.
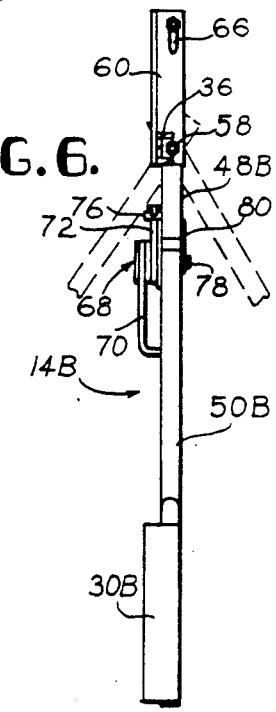

TRANSPONDER READER ARM ASSEMBLY

BACKGROUND OF THE INVENTION

1. Field of the Invention

This invention concerns an arm especially useful in stall and stanchion dairy barns and the like for carrying a reader for a transponder worn by cattle. The arm is carried by a feed car which moves on a rail through the barn, with the arm placing the reader in close proximity to the transponder. The arm is advantageously constructed to yield in response to stationary objects and return to its original position to avoid injury to cattle and damage to the unit.

2. Description of the Prior Art

Animal husbandry has long been a labor intensive operation requiring an extraordinary amount of human labor in the care and feeding of the livestock. This has been particularly true of the dairy industry, which has required that the animals be milked, fed and maintained for optimum milk production. In recent years, the size of the herd of the average dairy operation has grown due to the economies of scale connected with the equipment and overhead costs.

The increased size of the dairy herds has been accompanied by a sophistication in the management of the herd for increased productivity. One of the advances which have occured as technology has advanced is the use of a feed car which can move from stall to stall of a feeding barn to deliver food to the cow. This has been accompanied by a recognition that each individual cow may have different feed requirements for either maintenance, calving or lactation. Thus, in order to maximize revenue, the dairy farmer must chart each of his cows in order to provide the optimum ration corresponding to the cow's milk production and nutritional requirements.

The feed car has thus served to reduce labor requirements and has recently been configured to provide a mixed ration for the cattle in the barn. That is to say, the feed car is equipped to deliver portions of grain, vitamins and minerals and other nutrients simultaneously in one combined feeding. The feed car has also been able to deliver an individualized ration so that each animal receives a customized mix of nutrients to satisfy his or her feed requirements. This has been accomplished in one of two ways.

The first method has been to have each customized ration fed to a specific stall. This has required that the cow be directed to the same stall for each feeding.

The alternative method has been to have each cow wear a transponder which identifies the cow for determining the ration it is to receive. A reader picked up the radio signal sent by the transponder and sent it to a computer where the ration was ascertained from the memory. The reader and transponder work together much like a bar code read by an optical scanner for many consumer products. The computer then signals the feed car to provide the appropriate individualized ration to the cow by discharging the selected nutrients programmed into the data base for that animal.

While this system has shown great promise for greater efficiency and management of the dairy herd, a chief drawback has been the expense associated with installation of a system capable of providing a reader at each stall in order to detect the signal transmitted by the transponder worn by each animal. Thus, a multitude of readers would be required and no suitable system has been developed for mounting a single reader to the feed car for reading the transponders.

A chief problem in developing a satisfactory reader arm is the requirement that the reader be placed in close proximity to the transponder in order to detect the signal. Each transponder has only a very short range to prevent a plurality of signals being simultaneously received by a reader.

A second problem associated with the first has been the need to orient the reader in a proper position to read the transponder worn by the animal.

A third problem has been to develop a reader arm which is yieldable to such obstructions as a stall stanchion or a cow's head to prevent injury to the animal or to the arm. The arm must be able to yield in a vertical as well as a horizontal plane, as a cow may step on the arm as it passes by.

Additionally, the arm must be self-centering so that upon yielding, it will return to its original position and will not continuously oscillate and thereby "slap" a cow after yielding to an obstruction.

SUMMARY OF THE INVENTION

These and other problems are overcome by the transponder reader arm in accordance with the present invention. That is to say, the transponder reader arm hereof is suitable for mounting to a feed car and positions the reader in close proximity to the transponder while be yieldable to prevent damage to the unit or the animals being fed.

The transponder reader arm in accordance with the present invention broadly includes an arm adapted for mounting to a feed car or the like at one end and which carries a transponder reader at the other. The arm is pivotally mounted relative to the feed car so that it may swing in a horizontal direction. In addition, the arm may be configured to include a return spring enabling the arm to center itself following pivoting to avoid an obstacle.

In preferred forms, the transponder reader arm hereof includes a distal end pivotally mounted for movement in a generally vertical plane. The distal end of the reader arm is pivotally mounted to a first end of the arm which is pivotally connected to a mounting framework connected to the feed car. A return spring is provided for biasing the distal end into a desired, aligned position relative to the first end. This enables the reader arm to yield without breaking in response to forces applied thereto, such as a cow stepping on the arm or raising up and over an obstacle left on the feed table.

In an alternate form, the invention hereof may include a pair of parallel arms mounted to the feed car and including a connecting linkage interconnecting the two arms and maintaining them in parallel alignment. The arms are each pivotally mounted to the mounting framework and preferably include centering springs as outlined above for returning the arms to their desired, outwardly extending orientation when yielding, for example, in a horizontal plane. The transponder reader is mounted to the connecting linkage and thus is maintained in a constant orientation parallel to the path of the feed car in order to position the transponder reader in close proximity to the animal and thus the transponder to be read. Each of the arms may be constructed to include two pivotally connected ends for additional flexibility in a vertical plane.

BRIEF DESCRIPTION OF THE DRAWINGS

FIG. 3 is an enlarged side elevational view showing the pivotal mounting structure and vertical pivoting structure associated with arms of each embodiment of the present invention;

FIG. 4 is an enlarged side elevational view of the adjustable mounting frame for horizontally and vertically locating the transponder reader arms hereof;

FIG. 5 is and enlarged side elevational view of the connecting linkage which interconnects the pair of transponder reader arms as shown on the right of FIG. 1 and which carries the transponder reader; and FIG. 6 is an enlarged horizontal cross-sectional view taken along line 6—6 of FIG. 1 showing an alternate embodiment of the transponder reader arm assembly in accordance with the present invention.

DESCRIPTION OF THE PREFERRED EMBODIMENT

Figure 1:
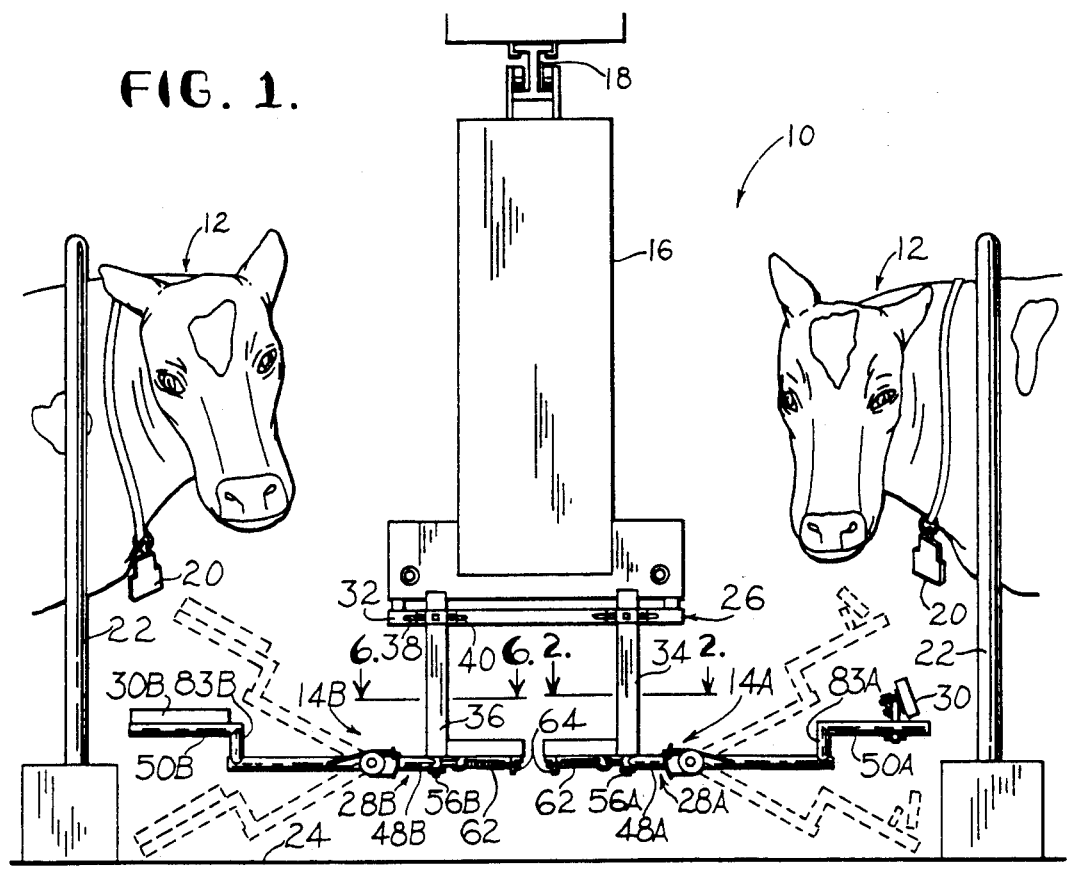
FIG. 1 is a front elevational view of the transponder reader arm assembly in accordance with the present invention, showing a first cow-engaging arm assembly in accordance with the present invention mounted to a mounting frame on a feed car on the right side of the drawing and an alternate cow-engaging arm assembly illustrating an alternate embodiment mounted on the mounting frame on the left of the drawing.

Referring now to the drawings, an automatic animal feeding unit 10 adapted for feeding dairy animals such as cows 12, broadly includes a pair of transponder reader arm assemblies 14A and 14B adapted for mounting to a feed car 16 which is movable along a path defined by an overhead rail 18. Each cow wears a transponder 20 which emits a radio signal identifying the individual cow 12. The animal feeding unit 10 normally operates in a feeding barn where the cows 12 stand between stanchions 22 and feed from the feed car 16 is deposited on the floor or feed table 24 for consumption by the cow 12 at each respective stall.

In greater detail, transponder reader arm assemblies 14A and 14B each include a mounting bracket 26, at least one pivotally mounted transponder reader arm 28 and a transponder reader 30. As shown in FIG. 1, the mounting bracket 26 may carry opposite, outwardly extending transponder reader arms 28A and 28B so that two rows of cows 12 may be serviced by a single feed car 16.

The mounting bracket 26 includes structure enabling each transponder reader arm 28 to be adjusted vertically and horizontally outwardly according to the particular configuration of the barn in which they are used. This structure on mounting bracket 26 includes a frame 32 secured to the feed car 16 by welding, bolts or the like and a pair of downwardly extending legs 34 and 36 connected to transponder reader arm assemblies 14A and 14B respectively.

Referring now to FIG. 4, the adjusting structure associated with the mounting bracket 26 may be seen in greater detail. Frame 32 is provided with a pair of elongated slots 38 and 40 which extend horizontally in a direction transverse to the path of the feed car 16 for each leg 34 and 36. A clamp 42 is slidably mounted to the frame 32 by a pair of adjustment bolts 44 secured by corresponding nuts. The clamp 42 is provided with an clamping bolt 46 which holds one of the legs 34 or 36 in position between the clamp 42 and the frame 32. The clamping bolt 46 is threadably inserted into the clamp 42 so that it may be loosened to permit vertical adjustment of the leg held thereby. Similarly, adjustment bolts 44 may be loosened to permit shifting of the arm in a transverse direction relative to the path of the feed car 16.

As may be seen in FIG. 1, legs 34 and 36 depend downwardly for pivotally mounting transponder reader arms 28 thereto. The transponder reader arms shown as 28A and 28B are similarly mounted to legs 34 and 36, respectively, and FIG. 3 illustrates the pivotal mounting structure of each arm 28A and 28B. Each arm 28 includes a first, inboard end 48 and a second, distal end 50. Inboard end 48 includes a bearing 52 having finger 54 extending normally inboard toward spring 62. A bolt 56, threadably coupled to nut 58, extends through bearing 52 and mounts transponder reader arm 28 to flange 60 which is welded or otherwise secured to one of legs 34 or 36.

Figure 2:
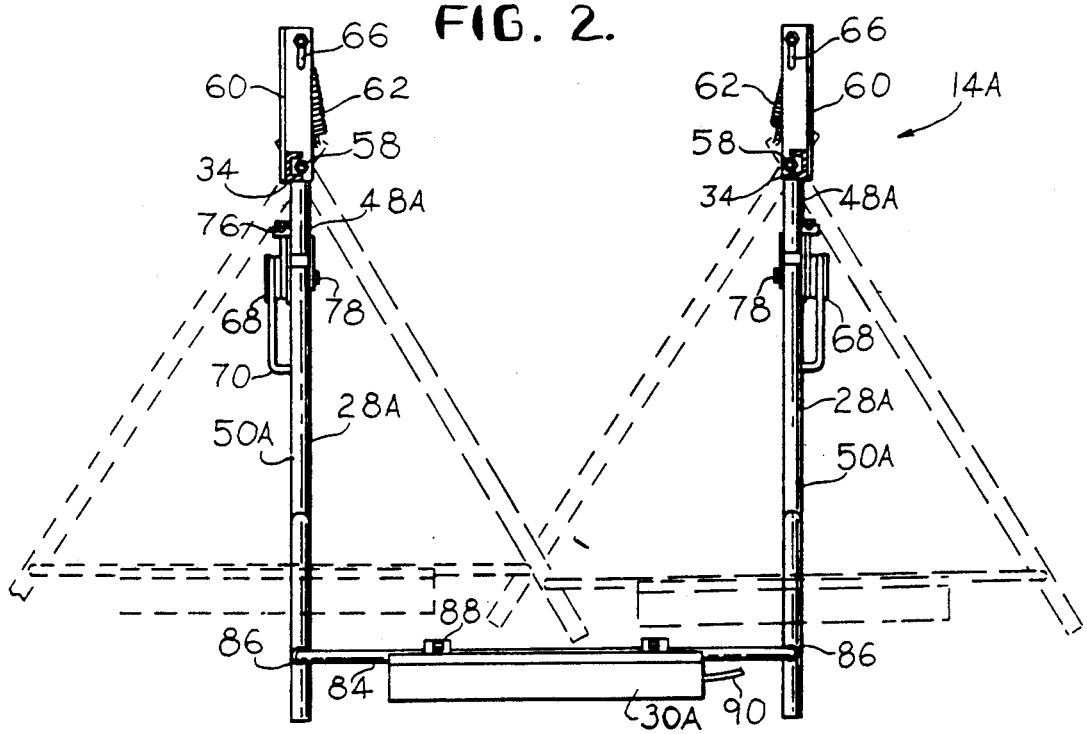
FIG. 2 is an enlarged horizontal cross-sectional view taken along line 2—2 of FIG. 1 showing a transponder reader arm assembly including a prair of cow-engaging arms pivotal in a horizontal plane interconnected by connecting linkage carrying a transponder reader.

Arm 28 is biased to a normally outwardly extending orientation in a direction transverse to the path of the feed car 16 by coil spring 62. Coil spring 62 is connected to finger 54 and to a tensioner 64 adjustable along slot 66 in flange 60 as shown in FIGS. 1, 2 and 6. As shown in the drawings, arms 28 are pivotal in a generally horizontal plane by the pivoting action provided by inboard end 48 about bolt 56.

In addition, transponder reader arms 28 include structure enabling distal end 50 to pivot in a generally vertical plane relative to inboard end 48. As shown in FIG. 3, each inboard end 48 is separate from distal end 50 but is connected by cantilever spring 68. The biasing force applied by cantilever spring is transmitted along reach 70 which is inserted through distal end 50. The proximate portion 72 of cantilever spring 68 is provided with an eye 74 for adjustable connection to spring mount 76 connected to inboard end 48. Spring mount 76 is generally arcuate in configuration and is slotted in a vertical plane therealong to permit varying the biasing force supplied by cantilever spring 68. Cantilever spring 68 is held in place by bolt 78 which passes through frontplate 80 and a bushing 81 carrying spring 68. Bolt 78 passes through the geometric center of cantilever spring 68, bushing 81 and through distal end 50 before passing through backplate 82 and is secured by a lock nut. Cantilever spring 68 serves to limit bouncing of the distal end 50 following displacement upon engagement with an obstacle and subsequent release. The frontplate 80 and the backplate 82 hold the cantilever spring in position against distal end 50 and substantially limit its pivoting to a vertical plane oriented transversely to the path of the feed car. As may be seen in FIG. 1, each distal end 50 includes a riser portion 83 which serves to place the transponder reader 30 in close proximity to the transponder 20 worn by the cow.

The transponder reader arm assembly 14A is shown in FIG. 2 which includes a pair of parallel transponder reader arms 28A and 28A' as shown and described hereinabove. The transponder reader arms linkage 84 which extends through receivers 86 and 86' to enable arms 28A and 28A' to pivot horizontally relative to connecting linkage 84. A crosspin 88 holds connecting linkage 84 in place but allows connecting linkage 84 to pivot relative to arms 28A and 28A'. As may be seen in phantom in FIG. 2, the connecting linkage 84, and thus the transponder reader 30, is oriented continuously outwardly in the same direction which preferably is parallel to the path of the feed car 16. As shown in FIG. 5, the transponder reader 30 includes a back mount 88 which couples transponder reader 30 to connecting linkage 84.

In the embodiment illustrated by transponder reader arm assembly 14B, a single transponder reader arm 28B carries a transponder reader 30 at its distal end 50. The transponder reader 30 as shown in FIG. 6 may be secured to the distal end 50 by any conventional means such as the back mount 88 shown in FIG. 5 but expanded to fit the arm 28B. The arm 28B is in all other respects identical to arm 28A and is free to pivot horizontally and is provided with a distal end which is free to pivot vertically just as in arm 28A.

In operation, the animal feeding unit travels along a rail or rails suspended from the ceiling of the dairy barn which thus define the path along which the unit will travel. The rail 18 as shown in FIG. 1 is oriented into the drawing page, and thus the transponder reader arms 28A and 28B extend outwardly therefrom in a direction transverse to the path of travel of the feed car 16.

The clamp 42 may be shifted sideways within slots 38 and 40 to position the transponder reader arms 28 corresponding to the configuration of the dimensions of the dairy barn, and the legs 34 and 36 may be moved up or down according to the desired height of the transponder reader 30 relative to the cow 12. Of course, each transponder reader 30 is electronically coupled by a cable 90 to the computer carrying the identifier data base for enabling the transponder reader to communicate with the feed car for delivering the proper ration to each cow.

After the feed car is charged with the desired nutrient components such as hay, soybean meal, silage, corn, vitamins and minerals and the like, the feeding unit 10 begins to move along the path defined by rail 18. Upon reaching the first stanchion 22, the feed car may deposit a "teaser" ration to draw the cow's head down to place the transponder 20 in close proximity to the transponder reader 30. The transponder reader 30 then reads the signal emitted by the transponder and communicates it to the feed car for supplying the desired ration to the cow 12.

The transponder reader arm assembly 14 hereof is especially useful in a dairy barn because a cow 12 may have her head down and in the way of the transponder 30. The transponder reader arm assembly hereof is free to pivot out of the way of the cow or other obstruction, with the coil spring serving to return the arm to its desired, outwardly extending orientation. The coil spring 62 is positioned and tensioned by tension 64 so that the arm will not swing wildly to "slap" a cow and thus make her fearful of the feeding unit 10 and thus impair her productivity. As shown in phantom in both FIG. 2 and FIG. 6, the arms 28A and 28B are free to pivot horizontally to allow the feeding unit 10 to move past a cow 12 or other obstacle in the way of the arms without harm to the obstacle or damage to the arms.

Yet further, the distal end 50 of each of the arms 28A and 28B is free to pivot vertically in the event a cow 12 were to step on the transponder reader 30 or other vertical force is applied to the arm 28. The cantilever spring 68 yields in response to such vertical force and returns the distal end 50 of the arm to the original, desired, outwardly extending position as shown in solid lines in FIG. 1. The spring 68 also serves to prevent "bouncing" or excessive oscillation of the distal end 50 when the displacing force is removed, and may be adjusted in tension along spring mount 76 should increased biasing force be necessary.

We claim:

1. A transponder reader arm adapted for use with a feed car movable along a path for feeding livestock in response to signals sent by individual transponders associated with members of the livestock, said transponder reader arm comprising:
   an arm presenting a first end and a second, distal end;
   means for pivotally mounting said arm relative to said car proximate said first end; and
   means mounting a transponder reader proximate said second end, whereby said car dispenses feed to the members of the livestock in response to said transponder reader receiving a signal from said individual tansponders.

2. A transponder reader arm as set forth in claim 1, wherein said arm mounting means includes structure for mounting said arm generally perpendicular to the path of said car.

3. A transponder reader arm as set forth in claim 2, wherein said arm mounting means includes structure for enabling pivoting of said arm about a generally vertical axis.

4. A transponder reader arm as set forth in claim 2, wherein said arm mounting means includes means for adjusting the vertical height of said arm relative to said car.

5. A transponder reader arm as set forth in claim 2, wherein said arm mounting means includes structure for adjusting the horizontal distance of said distal end relative to said car.

6. A transponder reader arm as set forth in claim 1, including means connected to said arm for centering said arm toward a first, desired position following displacement of said arm from said first position.

7. A transponder reader arm as set forth in claim 6, wherein said centering means includes structure for pivotal movement of said arm in a generally horizontal plane.

8. A transponder reader arm as set forth in claim 7, including structure for pivotally mounting said second, distal end of said arm relative to said first end.

9. A transponder reader arm as set forth in claim 8, including means for biasing said second, distal end of said arm toward an orientation generally aligned with said first end.

10. A transponder reader arm as set forth in claim 9, including structure adjustably mounting said biasing means to said first end of said arm.

11. A transponder reader arm as set forth in claim 1, wherein said transponder reader mounting means is oriented for carrying a transponder reader in substantial alignment with said second, distal end.

12. A transponder reader arm assembly adapted for use with a feed car movable along a path for feeding livestock in response to signals sent by individual transponders associated with members of the livestock, said transponder reader arm assembly comprising:
   a first arm presenting a first end and a second, distal end;
   a second arm presenting a first end and a second, distal end;

means for mounting said first end of said first arm and said first end of said second arm in pivotal relationship to the car;

means for interconnecting said first arm and said second arm and for maintaining said first arm and said second arm in constant parallel alignment during pivoting of each of said arms; and means for mounting a transponder reader proximate said second, distal end of one of said first arm or second arm, whereby said car dispenses feed to the members of the livestock in response to said transponder reader receiving a signal from said individual transponders.

13. A transponder reader arm assembly as set forth in claim 12 including means for biasing at least one of said arms to a desired, centered position.

14. A transponder reader arm assembly as set forth in claim 12 including means for pivoting the second, distal end of at least one of said arms relative to the first end of said at least one of said arms.

15. A transponder reader arm assembly as set forth in claim 14 including means for biasing said second, distal end of said at least one of said arms to a desired orientation relative to said first end of said at least one of said arms.

16. A transponder reader arm assembly as set forth in claim 12 wherein said first and second arm mounting means includes structure for pivoting said first end of each of said arms in a generally horizontal plane and each of said arms includes means for pivoting the second, distal end of each of said arms in a generally vertical plane relative to the first end of each respective arm.

17. In combination with a feed car movable along a path for feeding livestock in response to signals sent by individual transponders associated with members of the livestock, a transponder reader arm assembly comprising:

at least one arm presenting a first end and a second, distal end;

means mounting said at least one arm to said feed car in a transverse orientation relative to the path of said feed car, said mounting means including structure to allow for pivotal movement between said first end of said at least one arm and said car; and means for mounting a transponder reader adjacent said distal end, whereby said car dispenses feed to the members of the livestock in response to said transponder reader receiving a signal from said individual transponders.

18. A transponder reader arm assembly as set forth in claim 17 including means for biasing said one arm to a centered position transversely oriented relative to the path of said feed car.

19. A transponder reader arm assembly as set forth in claim 17, wherein said one arm includes structure for pivoting said second, distal end in a generally vertical plane relative to said first end.

20. A transponder reader arm assembly as set forth in claim 17 including a second arm pivotally connected to said mounting means, said second arm including a first end and a second, distal end, said assembly including means interconnecting said distal end of said first arm to said distal end of said second arm to permit simultaneous pivoting of said first and second arm in parallel orientation.

21. A transponder reader arm assembly as set forth in claim 20, including means for mounting said transponder reader to said interconnecting means intermediate said distal ends of said first arm and said second arm.

* * * * *